(12) United States Patent
Nishikawa et al.

(10) Patent No.: US 8,597,816 B2
(45) Date of Patent: Dec. 3, 2013

(54) SEPARATOR FOR NONAQUEOUS SECONDARY BATTERY, METHOD FOR PRODUCING THE SAME, AND NONAQUEOUS SECONDARY BATTERY

(75) Inventors: Satoshi Nishikawa, Yamaguchi (JP);
Takashi Yoshitomi, Yamaguchi (JP);
Guemju Cha, Yamaguchi (JP);
Takahiro Daido, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/596,414

(22) Filed: Aug. 28, 2012

(65) Prior Publication Data

US 2012/0321929 A1    Dec. 20, 2012

Related U.S. Application Data

(60) Division of application No. 13/069,111, filed on Mar. 22, 2011, which is a continuation of application No. 12/665,179, filed as application No. PCT/JP2008/060862 on Jun. 13, 2008, now Pat. No. 7,976,987.

(30) Foreign Application Priority Data

Jun. 19, 2007 (JP) ................................. 2007-161133

(51) Int. Cl.
*H01M 2/14* (2006.01)

(52) U.S. Cl.
USPC .......................................... 429/129; 429/122

(58) Field of Classification Search
USPC ....................................................... 429/129
See application file for complete search history.

(56) References Cited

U.S. PATENT DOCUMENTS

| | | | |
|---|---|---|---|
| 3,953,241 A | 4/1976 | Langer et al. | |
| 6,447,958 B1 | 9/2002 | Shinohara et al. | |
| 2002/0034689 A1 | 3/2002 | Hoshida et al. | |
| 2005/0228101 A1 | 10/2005 | McMahon et al. | |
| 2006/0234031 A1 | 10/2006 | Takata et al. | |
| 2009/0098450 A1* | 4/2009 | Kikuchi et al. | 429/145 |
| 2009/0117455 A1 | 5/2009 | Takita et al. | |

FOREIGN PATENT DOCUMENTS

| | | |
|---|---|---|
| CN | 1331496 A | 1/2002 |
| CN | 1499658 A | 5/2004 |
| CN | 1860627 A | 11/2006 |
| EP | 1 298 740 A2 | 4/2003 |
| EP | 2 131 418 A1 | 12/2009 |
| JP | 7272762 A | 10/1995 |
| JP | 2000-30686 A | 1/2000 |

(Continued)

OTHER PUBLICATIONS

Extended European Search Report for Application No. 12188483.7-2119 dated Nov. 30, 2012.

*Primary Examiner* — Barbara Gilliam
*Assistant Examiner* — Gary Harris
(74) *Attorney, Agent, or Firm* — Sughrue Mion, PLLC

(57) ABSTRACT

The present invention is to provide a separator that is excellent in heat resistance, shutdown function, flame retardancy and handling property. The separator for a nonaqueous secondary battery of the invention is a separator for a nonaqueous secondary battery that has a polyolefin microporous membrane at least one surface of which is laminated with a heat resistant porous layer containing a heat resistant resin, and is characterized by containing an inorganic filler containing a metallic hydroxide that undergoes dehydration reaction at a temperature of 200 to 400° C.

8 Claims, 6 Drawing Sheets

(56) References Cited

FOREIGN PATENT DOCUMENTS

| | | |
|---|---|---|
| JP | 3175730 B2 | 6/2001 |
| JP | 2001-210314 A | 8/2001 |
| JP | 2002-69221 A | 3/2002 |
| JP | 2003-40999 A | 2/2003 |
| JP | 2004-139867 A | 5/2004 |
| JP | 2005-149881 A | 6/2005 |
| JP | 2006-269359 A | 10/2006 |
| JP | 2006-307163 A | 11/2006 |
| JP | 2006-307193 A | 11/2006 |
| JP | 2006-351316 A | 12/2006 |
| JP | 2007-299612 A | 11/2007 |
| JP | 2008-80536 A | 4/2008 |
| TW | 460505 B | 10/2001 |
| WO | 2006064775 A1 | 6/2006 |
| WO | 2006123811 | 11/2006 |
| WO | 2007037290 A1 | 4/2007 |
| WO | 2007049568 A1 | 5/2007 |
| WO | WO 2007049568 A1 * | 5/2007 |
| WO | 2007094642 A1 | 8/2007 |

* cited by examiner

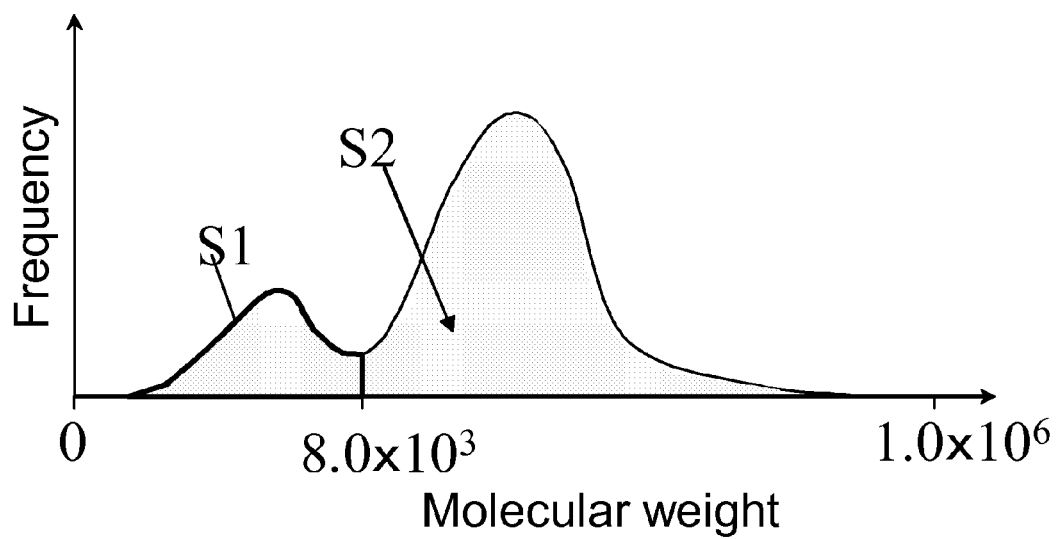

SEPARATOR FOR NONAQUEOUS SECONDARY BATTERY, METHOD FOR PRODUCING THE SAME, AND NONAQUEOUS SECONDARY BATTERY

CROSS REFERENCE TO RELATED APPLICATIONS

This is a Divisional application of U.S. patent application Ser. No. 13/069,111 filed Mar. 22, 2011, which is a Continuation application of U.S. patent application Ser. No. 12/665,179 filed Dec. 17, 2009, now U.S. Pat. No. 7,976,987 issued Jul. 12, 2011, which is a 371 of PCT/JP2008/060862 filed Jun. 13, 2008. The contents of the prior applications are incorporated by reference in their entirety.

TECHNICAL FIELD

The present invention relates to a separator for a nonaqueous secondary battery, and in particular, relates to a technique for enhancing safety of a nonaqueous secondary battery.

BACKGROUND ART

A nonaqueous secondary battery, which is represented by a lithium ion secondary battery, has a high energy density and is widely used as a main electric power source of a portable electronic equipment, such as a portable phone and a notebook computer. The lithium ion secondary battery is demanded to attain a further high energy density, but has a technical issue on assuring safety.

A separator plays an important role on assuring safety of a lithium ion secondary battery, and under the current situation, a polyethylene microporous membrane is used since it has a high strength and shutdown function. The shutdown function referred herein means a function of shutting down an electric current by closing the pores of the microporous membrane when the temperature of the battery is increased, and the battery is suppressed from generating heat by the function, thereby preventing the battery from suffering thermal runaway.

The energy density of the lithium ion secondary battery is being increased year by year, and for assuring safety, heat resistance is demanded in addition to the shutdown function. However, the shutdown function contradicts the heat resistance since the operation mechanism thereof depends on closure of the pores through melting of polyethylene. There have been proposals on improvement in heat resistance with the molecular weight of polyethylene, the crystalline structure or the like, but sufficient heat resistance has not yet been attained. Such techniques have been proposed that polypropylene is blended or laminated, but under the current situation, these systems fail to attain sufficient heat resistance. Furthermore, for enhancing the heat resistance with the shutdown function attained simultaneously, such techniques have been proposed that heat resistant porous layers are coated on both front and back surfaces of a polyethylene microporous membrane, and nonwoven fabrics containing heat resistant fibers are laminated thereon.

It is an important factor of a separator for assuring safety of a nonaqueous secondary battery that the separator has shutdown function and heat resistance, and furthermore, it is also important that the separator has flame retardancy from the standpoint of ignition. The currently available separator for a nonaqueous secondary battery as described above uses a polyethylene microporous membrane in consideration of shutdown characteristics, and there are many techniques for enhancing heat resistance mainly with the polyethylene microporous membrane. Polyethylene is a polymer that is highly combustible, and in consideration of the property, cannot be considered as having high safety.

Such a separator has been known that has a polyethylene microporous membrane and a heat resistant porous layer having an oxygen index of 26 or more, which are laminated on each other (see Patent Document 1). However, a polyethylene microporous membrane is still combustible even though it is coated with a layer having a high oxygen index, and it is not effective from the standpoint of flame retardancy.

Such a separator has been also known that has a polyethylene microporous membrane and a heat resistant porous layer laminated on each other, in which ceramic powder is mixed in the heat resistant porous layer (see Patent Document 2). In Patent Document 2, the ceramic powder is mixed for the purpose of improving the ion permeability. However, there is no effect in flame retardancy by adding ceramic powder, which is represented by a so-called metallic oxide. Furthermore, the separator has a handling problem, in which an equipment is severely abraded due to the ceramic particles, which are generally hard. In the case where the equipment is abraded, metallic powder and the like are attached to the separator and may cause decrease in capability of the battery.

In addition, techniques for imparting flame retardant effect to the separator by adding a flame retarder thereto (see Patent Documents 3 to 6). Patent Document 3 discloses examples of utilizing a halogen flame retarder and barium sulfate in the form of solid particles. Patent Documents 4 to 6 disclose examples of adding a polymer flame retarder to a separator. The proposals contribute to flame retardancy of a separator, but cannot enhance the heat resistance sufficiently, and thus it is difficult to assure safety of a battery.

Patent Document 1: JP-A-2006-269359
Patent Document 2: Japanese Patent No. 3,175,730
Patent Document 3: JP-A-7-272762
Patent Document 4: JP-A-2006-351316
Patent Document 5: JP-A-2005-149881
Patent Document 6: JP-A-2001-210314

DISCLOSURE OF THE INVENTION

Problems to be Solved by the Invention

It is the current situation that a practically useful separator that attains such functions as heat resistance, shutdown function and flame retardancy and suffers no problem in handling property has not yet been obtained. Accordingly, an object of the invention is to provide a separator that is excellent in heat resistance, shutdown function, flame retardancy and handling property.

Means for Solving the Problems

The invention provides the following inventions for solving the problems.

(1) A separator for a nonaqueous secondary battery containing a polyolefin microporous membrane at least one surface of which is laminated with a heat resistant porous layer containing a heat resistant resin, characterized by containing an inorganic filler containing a metallic hydroxide that undergoes dehydration reaction at a temperature of 200 to 400° C.

(2) The separator for a nonaqueous secondary battery according to the item (1), characterized in that the metallic hydroxide is at least one of aluminum hydroxide and magnesium hydroxide.

(3) The separator for a nonaqueous secondary battery according to the item (2), characterized in that the metallic hydroxide is aluminum hydroxide.

(4) The separator for a nonaqueous secondary battery according to one of the items (1) to (3), characterized in that the inorganic filler has an average particle diameter of 0.1 to 1 μm.

(5) The separator for a nonaqueous secondary battery according to one of the items (1) to (4), characterized in that the inorganic filler is contained in the heat resistant porous layer.

(6) The separator for a nonaqueous secondary battery according to the item (5), characterized in that the heat resistant porous layer contains the inorganic filler in an amount of 50 to 95% by weight.

(7) The separator for a nonaqueous secondary battery according to one of the items (1) to (6), characterized in that the heat resistant resin is at least one of wholly aromatic polyamide, polyimide, polyamideimide, polysulfone, polyketone, polyetherketone, polyetherimide and cellulose.

(8) The separator for a nonaqueous secondary battery according to the item (7), characterized in that the heat resistant resin is meta-type wholly aromatic polyamide.

(9) The separator for a nonaqueous secondary battery according to one of the items (1) to (8), characterized in that the separator for a nonaqueous secondary battery has a thickness of 25 μm or less, the polyethylene microporous membrane has a thickness of 5 μm or more, and the heat resistant porous layer has a thickness of 2 μm or more.

(10) The separator for a nonaqueous secondary battery according to one of the items (1) to (9), characterized in that the heat resistant porous layer has a porosity of 60 to 90%.

(11) The separator for a nonaqueous secondary battery according to one of the items (1) to (10), characterized in that the heat resistant porous layer is coated on both surfaces of the polyethylene microporous membrane.

(12) The separator for a nonaqueous secondary battery according to one of the items (1) to (11), characterized in that the heat resistant resin has a molecular weight distribution Mw/Mn of $5 \leq Mw/Mn \leq 100$ and a weight average molecular weight of $8.0 \times 10^3$ to $1.0 \times 10^6$.

(13) The separator for a nonaqueous secondary battery according to one of the items (1) to (12), characterized in that the heat resistant resin contains a low molecular weight polymer having a molecular weight of 8,000 or less in an amount of 1 to 15% by weight.

(14) The separator for a nonaqueous secondary battery according to the item (7), characterized in that the heat resistant resin is wholly aromatic polyamide, and the wholly aromatic polyamide has an end group concentration ratio of $[COOX]/[NH_2] \geq 1$ (wherein X represents an alkali metal or an alkaline earth metal).

(15) The separator for a nonaqueous secondary battery according to one of the items (1) to (14), characterized in that the inorganic filler satisfies the following items (a) and (b):

$$0.1 \leq d50 \leq 1 \ (\mu m) \quad (a)$$

$$0 < \alpha \leq 2 \quad (b)$$

wherein d50 represents an average particle diameter (μm) of weight accumulation of 50% by weight calculated from a smaller particle side in a particle size distribution by laser diffraction, and α represents homogeneity of the inorganic filler and is expressed by $\alpha = (d90-d10)/d50$, wherein d90 represents an average particle diameter (μm) of weight accumulation of 90% by weight calculated from a smaller particle side in a particle size distribution by laser diffraction, and d10 represents an average particle diameter (μm) of weight accumulation of 10% by weight calculated from a smaller particle side in a particle size distribution by laser diffraction.

(16) A method for producing a separator for a nonaqueous secondary battery containing a polyolefin microporous membrane at least one surface of which is laminated with a heat resistant porous layer containing a heat resistant resin, characterized by performing:

(i) a step of dissolving the heat resistant resin in a solvent, and dispersing therein an inorganic filler containing a metallic hydroxide that undergoes dehydration reaction at a temperature of 200 to 400° C. to produce a coating slurry;

(ii) coating the slurry on at least one surface of the polyolefin microporous membrane;

(iii) immersing the polyolefin microporous membrane coated with the slurry in a coagulation liquid capable of coagulating the heat resistant resin;

(iv) removing the coagulation liquid by rinsing with water; and (v) drying water.

(17) A nonaqueous secondary battery containing a positive electrode, a negative electrode, a separator provided between the electrodes, and a nonaqueous electrolytic solution, characterized in that the separator is the separator for a nonaqueous secondary battery according to one of the items (1) to (15).

Advantages of the Invention

According to the invention, such a novel separator for a nonaqueous secondary battery is obtained that is excellent in heat resistance, shutdown function, flame retardancy and handling property. The separator is significantly advantageous for enhancing safety and durability of a nonaqueous secondary battery.

BRIEF DESCRIPTION OF THE DRAWINGS

[FIG. 6] The figure is a conceptual diagram showing schematically a GPC curve.

BEST MODE FOR CARRYING OUT THE INVENTION

Figure 1:
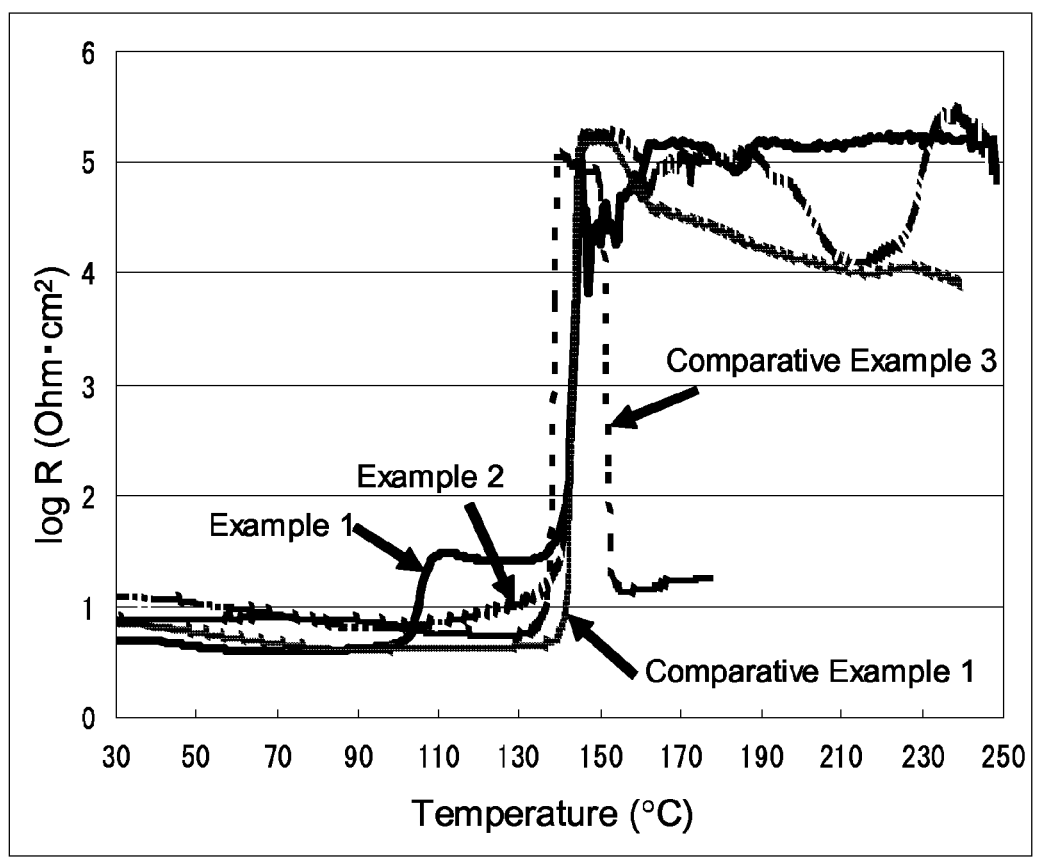
[FIG. 1] The figure is a graph showing evaluation results of shutdown characteristics of separators of the invention and other separators.

The separator for a nonaqueous secondary battery is a separator for a nonaqueous secondary battery that contains a polyolefin microporous membrane at least one surface of which is laminated with a heat resistant porous layer containing a heat resistant resin, and is characterized by containing an inorganic filler containing a metallic hydroxide that undergoes dehydration reaction at a temperature of 200 to 400° C.

One of the major characteristic features of the invention is the use of a metallic hydroxide that undergoes dehydration reaction at a temperature of 200 to 400° C. as the inorganic filler. The use of the metallic hydroxide achieves flame retardancy of the separator for a nonaqueous secondary battery and considerably enhances the safety of the battery totally. It has been considered that in a separator for a lithium ion secondary battery, the addition of an inorganic filler adversely influences the battery characteristics when a polar group, such as a hydroxyl group, is contained in the inorganic filler, and therefore, a skilled person in this field of art has not selected a metallic hydroxide as a material used (see WO 98/32184, p. 7, lines 12 to 16, and the like). However, the inventors have found that the addition of a metallic hydroxide, such as aluminum hydroxide, to a separator not only does not adversely influence the battery characteristics, but also provides various advantages including flame retardancy, and thus the invention has been completed.

The effects obtained by the addition of a metallic hydroxide will be specifically described. A metallic hydroxide undergoes dehydration reaction upon heating, thereby forming an oxide and releasing water. The dehydration reaction is reaction that is associated with large endotherm. Accordingly, in the case where a separator containing a metallic hydroxide is installed in a battery, dehydration reaction associated with release of water and endotherm occurs upon increasing the temperature of the battery, thereby attaining flame retardancy of the separator. The combustible electrolytic solution is diluted with released water, and thus flame retardancy of the electrolytic solution is attained in addition to the separator, which is effective for attaining flame retardancy of the battery totally. A metallic hydroxide is relatively soft as compared to a metallic oxide, such as alumina, and thus does not cause a handling problem, such as abrasion of members used in the steps upon production due to the inorganic filler contained in the separator.

In the invention, the metallic hydroxide undergoes dehydration reaction at a temperature of 200 to 400° C., and preferably 250 to 350° C. It is considered that the most dangerous factor in a nonaqueous secondary battery is endotherm associated with decomposition reaction at a positive electrode, and the decomposition reaction occurs around 300° C. Accordingly, endotherm of a battery can be effectively prevented from occurring when the temperature, at which dehydration reaction of the metallic hydroxide occurs, is in a range of 200 to 400° C. The negative electrode is safe when the temperature of the battery is 200° C. or more since the negative electrode substantially loses activity to prevent endothermic reaction with the generated water from occurring. When the dehydration temperature of the metallic hydroxide is 200° C. or more, the dehydration reaction does not occur at a temperature that is lower than the shutdown temperature of the polyolefin microporous membrane, and therefore, the shutdown characteristics are not influenced.

Examples of the metallic hydroxide include aluminum hydroxide, magnesium hydroxide, calcium hydroxide, chromium hydroxide, nickel hydroxide, boron hydroxide and combinations of two or more of them, but the invention is not limited to them. Among these, aluminum hydroxide undergoes dehydration reaction within a temperature range of approximately 250 to 300° C., and magnesium hydroxide undergoes dehydration reaction within a temperature range of approximately 350 to 400° C. Accordingly, at least one of aluminum hydroxide and magnesium hydroxide is preferably used in the invention. In particular, aluminum hydroxide is most preferred in consideration of effective use of endotherm associated with the dehydration reaction. As the aluminum hydroxide, one having a gibbsite composition, one having a bayerite composition, and one having a mixed composition of them are preferred, and among these, one having a gibbsite composition is particularly preferred. In addition to the inorganic filler containing a metallic hydroxide, a metallic oxide, such as alumina, titania, silica and zirconia, and other inorganic fillers, such as a carbonate salt and a phosphate salt, may be used by mixing in such a range that the handling property and the battery capability are not adversely affected.

Aluminum hydroxide is preferred as compared to the other metallic hydroxides from the standpoint of shutdown characteristics and meltdown characteristics. Specifically, the inventors have evaluated a separator containing aluminum hydroxide for shutdown characteristics, and have found that the resistance is increased by approximately 10 times at a temperature around 100° C. (see Example 1 in FIG. 1). The phenomenon means that the separator of the invention starts shutdown at a lower temperature than a conventional separator containing only a polyolefin microporous membrane or the like, and thus functions advantageously for assuring safety of a battery. The inventors have also found that the resistance of the battery is quickly increased when full-fledged shutdown occurs by increasing the temperature of the battery to around the melting point of polyethylene (see Example 1 in FIG. 1). The phenomenon means that the separator of the invention can shut down an electric current instantly when the temperature of the battery is increased, and thus has excellent shutdown function. The behavior efficiently functions when a thinner polyolefin microporous membrane is applied to the base. The inventors have also found that the separator of the invention continuously maintains a high resistance value even in a high temperature region after shutdown (see Example 1 in FIG. 1). The phenomenon means that the separator is excellent in anti-meltdown characteristics and is considerably excellent in safety at a high temperature.

In addition, aluminum hydroxide and magnesium hydroxide are preferred since they protect the positive electrode from hydrofluoric acid present in the nonaqueous secondary battery to enhance the durability of the battery. Specifically, in a nonaqueous secondary battery, hydrofluoric acid is a factor of corroding the positive electrode active substance to deteriorate the durability, but aluminum hydroxide and magnesium hydroxide have a function of adsorbing and coprecipitating hydrofluoric acid. Accordingly, the use of a separator containing the metallic hydroxide can maintain the hydrofluoric acid concentration in the electrolytic solution to a low level, thereby enhancing the durability of the battery.

The separator of the invention may contain the inorganic filler in any portion of the separator, for example, the polyolefin microporous membrane, the heat resistant porous layer and other layers laminated on these layers, and particularly preferably the inorganic filler is contained in the heat resistant porous layer. In the separator of the invention, the heat resistant porous layer imparts heat resistance to the separator, and the addition of the inorganic filler to the layer further enhances the heat resistance of the heat resistant porous layer, thereby improving prevention of short circuit and dimensional stability at a high temperature. Furthermore, there is a general tendency that the heat resistant porous layer is electrostatically charged strongly, and owing to the phenomenon, is not favorable in handling property. In the case where a metallic hydroxide, such as aluminum hydroxide, is added to the heat resistant porous layer, the electric charge thus charged can be rapidly attenuated. Accordingly, the electric charge can be maintained to a low level, thereby enhancing the handling property of the separator.

The average particle diameter of the inorganic filler containing the metallic hydroxide is preferably 0.1 to 1 µm. In the case where the average particle diameter exceeds 1 µm, the separator may unfavorably fail to prevent sufficiently short circuit from occurring upon exposing the separator to a high temperature. Furthermore, with the structure of mixing the inorganic filler in the heat resistant porous layer, the heat resistant porous layer may be difficult to be formed to have a suitable thickness. In the case where the average particle diameter is less than 0.1 μm, the inorganic filler is liable to be dropped off as powder from the separator, and thus in the case where the inorganic filler is mixed in the heat resistant porous layer, the strength of the heat resistant porous layer may be decreased. Furthermore, the use of a small filler is substantially difficult from the standpoint of cost.

The inorganic filler preferably satisfies the following items (a) and (b).

$$0.1 \leq d50 \leq 1 \ (\mu m) \quad (a)$$

$$0 < \alpha \leq 2 \quad (b)$$

More preferably, the above item (a) and the following item (c) are satisfied.

$$0 < \alpha \leq 1 \quad (c)$$

Herein, d50 represents an average particle diameter (μm) of weight accumulation of 50% by weight calculated from a smaller particle side in a particle size distribution by laser diffraction. α represents homogeneity of the inorganic filler and is expressed by $\alpha = (d90 - d10)/d50$. d90 represents an average particle diameter (μm) of weight accumulation of 90% by weight calculated from a smaller particle side in a particle size distribution by laser diffraction. d10 represents an average particle diameter (μm) of weight accumulation of 10% by weight calculated from a smaller particle side in a particle size distribution by laser diffraction.

The use of the inorganic filler having the aforementioned particle size distribution increases the packing density of the inorganic filler in the separator and enhances the effect of flame retardancy owing to the inorganic filler containing particles that have variation in particle diameter. Furthermore, the heat resistant porous layer is liable to be fixed favorably to the polyolefin microporous membrane, thereby preventing the heat resistant porous layer from being dropped off. Moreover, the particles having a small diameter contribute to formation of pores in the heat resistant porous layer, and the particles having a large diameter appear on the surface of the heat resistant porous layer to improve the sliding property. A value for d50 of less than 1 μm is not preferred due to such factors that the inorganic filler is liable to be dropped off as powder from the separator. A value for d50 exceeding 1 μm is not preferred due to such factors that the heat resistant porous layer is difficult to be formed to have a suitable thickness. When α is 0, a monodisperse particle diameter is obtained to fail to provide enhancement of the packing density of the inorganic filler. When α exceeds 2, coarse particles or minute particles are contained, and thus the coating property may be deteriorated.

The heat resistant porous layer of the invention contains the heat resistant resin, has numerous minute pores inside, and has such a structure that the minute pores are connected to each other, thereby providing a porous layer, through which a gas or a liquid can pass from one surface to the other surface.

As the heat resistant resin, a resin that has a melting point of 250° C. or more and a resin that does not substantially have a melting point but has a thermal decomposition temperature of 250° C. or more are preferably used. Examples of the heat resistant resin include at least one selected from wholly aromatic polyamide, polyimide, polyamideimide, polysulfone, polyketone, polyetherketone, polyetherimide and cellulose.

In particular, from the standpoint of durability, wholly aromatic polyamide is preferably used, and meta-type wholly aromatic polyamide is further preferred from the standpoint that the porous layer can be easily formed and is excellent in oxidation and reduction resistance.

The heat resistant resin preferably has a molecular weight distribution Mw/Mn of $5 \leq Mw/Mn \leq 100$ and a weight average molecular weight of $8.0 \times 10^3$ to $1.0 \times 10^6$, thereby providing a favorable heat resistant porous layer upon forming the heat resistant porous layer by a wet coating method on the polyolefin microporous membrane. Specifically, the heat resistant resin having a wide molecular weight distribution as shown above contains a large amount of a low molecular weight matter, and a coating liquid containing the polymer dissolved therein is improved in processability. Accordingly, a heat resistant porous layer having less defects and a homogeneous thickness can be easily provided. Furthermore, the coating liquid can be coated favorably without application of a strong coating pressure, whereby the surface pores of the polyolefin microporous membrane are not clogged to prevent the air permeability at the interface between the heat resistant porous layer and the polyolefin microporous membrane form being lowered. Moreover, when the coating liquid is coated on the polyolefin microporous membrane and immersed in a coagulation liquid, the polymer in the coating liquid is enhanced in mobility to provide favorable pores. Further, the inorganic filler contributing to the formation of pores can be prevented from being dropped off as powder owing to good affinity between the low molecular weight matter and the inorganic filler. Consequently, a favorable heat resistant porous layer having uniform minute pores can be easily provided. Accordingly, such a separator can be obtained that has excellent ion permeability and good contact property with the electrodes.

In a preferred embodiment, the heat resistant resin contains a low molecular weight polymer having a molecular weight of 8,000 or less in an amount of 1 to 15% by weight, and preferably in an amount of 3 to 10% by weight, whereby a favorable heat resistant porous layer can be provided as similar to the above.

In the case where aromatic polyamide is used as the heat resistant resin, the aromatic polyamide has an end group concentration ratio of $[COOX]/[NH_2] \geq 1$. X represents hydrogen, an alkali metal or an alkaline earth metal. The end carboxyl group, such as COONa, has a function of renewing and removing an unfavorable film formed on the negative electrode of the battery. Accordingly, the use of aromatic polyamide having a larger amount of end carboxyl groups than end amine groups provides a nonaqueous secondary battery that has a stable discharge capacity for a prolonged period of time. For example, such a battery can be obtained that still has a favorable discharge capacity after subjecting to 100 charge-discharge cycles.

In the invention, the heat resistant porous layer preferably contains the inorganic filler in an amount of 50 to 95% by weight, and more preferably 70 to 85% by weight. When the weight fraction of the inorganic filler is less than 50% by weight, the characteristics relating to heat resistance, such as the dimensional stability at a high temperature, may be insufficient. When it exceeds 95% by weight, the strength of the heat resistant porous layer may be insufficient to provide such problems as poor handling property due to drop-off of powder, and difficulty in molding.

The heat resistant porous layer preferably has a porosity of 60 to 90%. When the porosity of the heat resistant porous layer exceeds 90%, the heat resistance may be unfavorably insufficient. When it is less than 60%, there is unfavorably such a tendency that the cycle characteristics, storage characteristics and discharge property are deteriorated. The coated amount of the heat resistant porous layer is preferably 2 to 10 g/m².

The polyolefin microporous membrane in the invention contains a polyolefin, has numerous minute pores inside, and has such a structure that the minute pores are connected to each other, thereby providing a membrane, through which a gas or a liquid can pass from one surface to the other surface. Examples of the polyolefin include polyethylene, polypropylene, polymethylpentene and combinations thereof. Polyethylene is particularly preferred, and preferred examples of the polyethylene include high density polyethylene and a mixture of high density polyethylene and ultrahigh molecular weight polyethylene.

The polyolefin microporous membrane preferably has a porosity of 20 to 60%. When the porosity is less than 20%, the membrane resistance of the separator is unfavorably increased, thereby decreasing the output power of the battery. When the porosity exceeds 60%, the shutdown characteristics may be unfavorably decreased considerably.

The polyolefin microporous membrane preferably has an air permeability per unit thickness (JIS P8117) of 10 sec/100 cc·µm or more. When the air permeability per unit thickness is lower than 10 sec/100 cc·µm, the polyolefin microporous membrane may be unfavorably clogged at the interface between the heat resistant porous layer and the polyolefin microporous membrane, thereby increasing the membrane resistance significantly and deteriorating the shutdown characteristics significantly.

The polyolefin microporous membrane preferably has Y/X of $1 \times 10^{-3}$ to $1 \times 10^{-2}$ ohm·cm²/(sec/100 cc), wherein the air permeability (JIS P8117) is represented by X sec/100 cc, and the membrane resistance upon impregnating the polyolefin microporous membrane with an electrolytic solution is represented by Y ohm·cm².

In general, the air permeability X is given by the following expression (1).

$$X = K(\tau^2 \cdot L)/(\epsilon \cdot d) \quad (1)$$

wherein K represents a proportionality constant derived from measurement, $\tau$ represents the tortuosity, L represents the thickness, and d represents the average pore diameter. The membrane resistance Y is given by the following expression (2).

$$Y = \rho \tau^2 \cdot L/\epsilon \quad (2)$$

wherein $\rho$ represents the specific resistance of the electrolytic solution, with which the separator is impregnated. According to the expressions (1) and (2), Y/X is given by the following expression (3).

$$Y/X = (\rho/K) \cdot d \quad (3)$$

Accordingly, Y/X is a parameter that is proportional to the pore diameter d of the polyolefin microporous membrane. The range of Y/X in the invention is obtained by measuring the membrane resistance Y at 20° C. by using an electrolytic solution obtained by dissolving $LiBF_4$ in a concentration of 1 M in a solvent containing propylene carbonate and ethylene carbonate mixed at a weight ratio of 1/1. This means the favorable range of the pore diameter d of the polyolefin microporous membrane. A conventional polyolefin microporous membrane as a ordinary separator for a lithium ion secondary battery has Y/X in a range of $1 \times 10^{-2}$ to $1 \times 10^{-1}$ ohm·cm²/(sec/100 cc), and the polyolefin microporous membrane base in the invention has a small pore diameter as compared thereto. The specific resistance $\rho$ of the electrolytic solution at 20° C. is $2.66 \times 10^2$ ohm·cm, and K is 0.0778 sec/100 cc. Accordingly, $\rho/K$ is $3.4 \times 10^3$ ohm·cm/(sec/100 cc). Consequently, the average pore diameter d is calculated to be 3.0 to 30 nm. When Y/X is less than $1 \times 10^{-3}$ ohm·cm²/(sec/100 cc), impregnation with an electrolytic solution may be difficult to provide problems upon applying the separator. When Y/X exceeds $1 \times 10^{-2}$ ohm·cm²/(sec/100 cc), clogging of the heat resistant porous layer may be induced at the interface between the heat resistant porous layer and the polyolefin microporous membrane, thereby providing such problems as increase of the membrane resistance of separator and significant deterioration of the shutdown characteristics.

In the invention, the heat resistant porous layer may be coated at least one surface of the polyolefin microporous membrane serving as the base, and it is more preferred that it is coated on both surfaces thereof. This is because when it is coated on both surfaces thereof, not only a problem due to curling can be avoided to improve the handling property, but also the dimensional stability at a high temperature can be largely improved, thereby enhancing the durability of the battery.

In the separator for a nonaqueous secondary battery of the invention, the polyolefin microporous membrane preferably has a thickness of 5 µm or more. When the thickness of the polyolefin microporous membrane is less than 5 µm, the mechanical properties thereof, such as the tensile strength and the piercing strength, may be unfavorably insufficient. The heat resistant porous layer preferably has a thickness of 2 µm or more. When the thickness of the heat resistant porous layer is less than 2 µm, it may be difficult to provide sufficient heat resistance. The separator for a nonaqueous secondary battery of the invention preferably has a thickness of 25 µm or less, and more preferably 20 µm or less. When the thickness of the separator exceeds 25 µm, the energy density and the output characteristics of the battery, to which the separator is applied, may be unfavorably decreased.

The separator for a nonaqueous secondary battery of the invention preferably has an air permeability (JIS P8117) of 500 sec/100 cc or less. When the air permeability exceeds 500 sec/100 cc, such a problem may occur that the ion permeability becomes insufficient to increase the membrane resistance of the separator, which brings about decrease in output power of the battery. For providing an air permeability of 500 sec/100 cc or less for the separator, the polyolefin microporous membrane used therefor preferably has an air permeability of 400 sec/100 cc or less.

The separator for a nonaqueous secondary battery of the invention preferably has a membrane resistance of 0.5 to 10 ohm·cm², and more preferably 1 to 5 ohm·cm². The piercing strength thereof is preferably 300 g or more, and more preferably 400 g or more. For the constitution, the polyolefin microporous membrane preferably has a piercing strength of 300 g or more. The weight per unit varies largely depending on the specific gravity of the constitutional materials and cannot be determined unconditionally, and it is preferably approximately 6 to 20 g/m². The heat contraction ratio thereof is preferably 30% or less in both MD and TD. The heat contraction ratio referred herein is a ratio of decrease in dimension of a specimen when the specimen is subjected to a heat treatment at 175° C. without tension. The oxygen index thereof is preferably 19% or more. The half period of withstand voltage thereof is preferably 30 minutes or less.

The method for producing the separator for a nonaqueous secondary battery of the invention is not particularly limited, and the separator can be produced, for example, by the following steps:

(i) a step of dissolving the heat resistant resin in a solvent, and dispersing therein an inorganic filler containing a metallic hydroxide that undergoes dehydration reaction at a temperature of 200 to 400° C. to produce a coating slurry;

(ii) coating the slurry on at least one surface of the polyolefin microporous membrane;

(iii) immersing the polyolefin microporous membrane coated with the slurry in a coagulation liquid capable of coagulating the heat resistant resin;

(iv) removing the coagulation liquid by rinsing with water; and (v) drying water.

In the step (i), the solvent may be anyone that dissolves the heat resistant resin without particular limitation. Specifically, a polar solvent is preferred, and examples thereof include N-methylpyrrolidone, dimethylacetamide, dimethylformamide and dimethylsulfoxide. The solvent may contain the polar solvent and additionally a poor solvent to the heat resistant resin, and the addition of the poor solvent induces a microscopic phase separation structure to facilitate formation of pores upon providing the heat resistant porous layer. Preferred examples of the poor solvent include an alcohol, and a polyhydric alcohol, such as glycol, is particularly preferred. In the case where the dispersibility of the inorganic filler is not good in the step (i), such a method may be applied that the inorganic filler is surface-treated with a silane coupling agent or the like to improve the dispersibility.

In the step (ii), the slurry is coated on at least one surface of the polyolefin microporous membrane, and in the case where the heat resistant porous layers are formed on both surfaces of the polyolefin microporous membrane, it is preferred to coat the slurry on both the surfaces of the polyolefin microporous membrane simultaneously from the standpoint of reduction in steps. Examples of the method for coating the slurry include a knife coater method, a gravure coater method, a screen printing method, a Meyer bar method, a die coater method, a reverse roll coater method, an ink-jet method, a spraying method and a roll coater method. Among these, a reverse roll coater method is particularly preferred from the standpoint that the coated film of the slurry system is uniformly coated. In the case where the slurry is coated on both the surfaces of the polyolefin microporous membrane, such a method may be exemplified that the polyolefin microporous membrane is passed between a pair of Meyer bars to be coated with an excessive amount of the slurry on both surfaces, and then passed through a coater with a pair of reverse rolls to scrape the excessive slurry, thereby precisely weighing the slurry.

In the step (iii), the polyolefin microporous membrane coated with the slurry is immersed in a coagulation liquid capable of coagulating the heat resistant resin for coagulating the heat resistant resin, thereby forming a porous layer having the inorganic filler bound therein. Examples of the method include a method of spraying the coagulation liquid and a method of immersing in a bath containing the coagulation liquid (i.e., a coagulation bath). In the case where the coagulation bath is provided, it is preferably provided under the coating apparatus.

The coagulation liquid is not particularly limited as far as it can coagulate the heat resistant resin, and from the standpoint of process, is preferably a mixture containing the solvent used in the slurry and water added in a suitable amount. The amount of water mixed is preferably 40 to 80% by weight. When the amount of water is less than 40% by weight, such problems may occur that the period of time required for coagulating the heat resistant resin is prolonged, and the coagulation becomes insufficient. When the amount of water exceeds 80% by weight, such problems may occur that the cost is increased upon recovering the solvent, and the surface in contact with the coagulation liquid is coagulated too quickly to prevent the surface from becoming porous sufficiently.

The step (iv) is a step of removing the coagulation liquid, and a method of rinsing with water is preferred.

The step (v) is a step of drying water, and the drying method is not particularly limited. The drying temperature is preferably 50 to 80° C., and in the case where a high drying temperature is employed, a method of making into contact with a roll is preferably employed for preventing dimensional change due to heat contraction from occurring.

The separator for a nonaqueous secondary battery of the invention may be applied to a nonaqueous secondary battery of any mode that provides an electromotive force through doping and dedoping of lithium. The nonaqueous secondary battery of the invention has such structure that a battery element containing a negative electrode and a positive electrode facing each other via a separator is impregnated with an electrolytic solution, which are encapsulated in an outer package.

The negative electrode has such a structure that a negative electrode composition containing a negative electrode active substance, an electroconductive assistant and a binder is formed on a collector. Examples of the negative electrode active substance include a material capable of electrochemically doping lithium, and specific examples thereof include a carbon material, silicon, aluminum, tin and a wood's metal. Examples of the electroconductive assistant include a carbon material, such as acetylene black and Ketjen black. The binder contains an organic polymer, and examples thereof include polyvinylidene fluoride and carboxymethyl cellulose. As the collector, a copper foil, a stainless steel foil, a nickel foil and the like may be used.

The positive electrode has such a structure that a positive electrode composition containing a positive electrode active substance, an electroconductive assistant and a binder is formed on a collector. Examples of the positive electrode active substance include a lithium-containing transition metal oxide, and specific examples thereof include $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$ and $LiFePO_4$. Examples of the electroconductive assistant include a carbon material, such as acetylene black and Ketjen black. The binder contains an organic polymer, and examples thereof include polyvinylidene fluoride. As the collector, an aluminum foil, a stainless steel foil, a titanium foil and the like may be used.

The electrolytic solution has such a constitution that a lithium salt is dissolved in a nonaqueous solvent. Examples of the lithium salt include $LiPF_6$, $LiBF_4$ and $LiClO_4$. Examples of the nonaqueous solvent include propylene carbonate, ethylene carbonate, dimethyl carbonate, diethyl carbonate, ethylmethyl carbonate, γ-butyrolactone and vinylene carbonate, which may be used solely or after mixing.

Examples of the outer package material include a metallic canister and an aluminum laminated package. The shape of the battery include a rectangular shape, a cylinder shape, a coil shape and the like, to all of which the separator of the invention may be applied.

EXAMPLES

<1. Measurement Methods>

The measurement methods in the examples will be described.

[Average Particle Diameter and Particle Size Distribution of Inorganic Filler]

The measurement was performed with a laser diffraction particle size distribution measuring apparatus (Mastersizer 2000, produced by Sysmex Corporation). Water was used as a dispersion medium, and a minute amount of a nonionic surfactant (Triton X-100) was used as a dispersant. The center particle diameter (D50) in the volume particle size distribution was designated as the average particle diameter.

[Thickness]

The thickness was obtained by measuring 20 points per a specimen with a contact type thickness meter (produced by Mitutoyo Corporation), and obtaining the average value of them. The contact probe used had a cylindrical shape with a diameter on the bottom surface of 0.5 cm, and the measurement was performed under the condition where a load of 1.2 kg/m² was applied to the contact probe.

[Air Permeability]

The air permeability (sec/100 cc) was measured according to JIS P8117. The air permeability per unit thickness was obtained by dividing the measured air permeability (sec/100 cc) by the thickness (μm).

[Weight Per Unit]

A separator as a specimen was cut into a dimension of 10 cm×10 cm, which was measured for weight, and the measured value was converted to the weight per 1 m² to provide the weight per unit.

[Coated Amount of Heat Resistant Porous Layer]

The separator having the heat resistant porous layer coated thereon and the polyethylene microporous membrane used therefor were measured for weight per unit, and the coated amount of the heat resistant porous layer was obtained from the difference between them.

[Porosity]

The porosity ε (%) was obtained by the following expression:

$$\epsilon = \{1-(Wa/da+Wb/db+Wc/dc+\ldots+Wn/dn)/t\} \times 100$$

wherein a, b, c . . . n represent the constitutional materials; Wa, Wb, Wc . . . Wn represent the weights of the constitutional materials (g·cm²); da, db, dc . . . dn represent the true densities thereof (g/cm³); and t represents the thickness of the layer to be measured (cm).

[Membrane Resistance]

A separator as a specimen was cut into a dimension of 2.6 cm×2.0 cm. The cut specimen was immersed in a methanol solution having 3% by weight of a nonionic surfactant (Emulgen 210P, produced by Kao Corporation) dissolved therein, followed by air drying. An aluminum foil having a thickness of 20 μm was cut into a dimension of 2.0 cm×1.4 cm, and was attached with a conductive lead tab. Two pieces of the aluminum foil were prepared, and the cut separator was held with two pieces of the aluminum foil, which were prevented from forming short circuit. The separator was impregnated with an electrolytic solution, which was formed by dissolving LiBF₄ in a concentration of 1 M in a solvent containing propylene carbonate and ethylene carbonate mixed at a weight ratio of 1/1. The assembly was encapsulated in an aluminum laminated package under reduced pressure with the tabs being outside the aluminum package. The cells were produced each with one piece, two pieces or three pieces of the separator within the aluminum foil. The cells were placed in a thermostatic bath at 20° C., and the cells were measured for resistance by an alternating current impedance method with an amplitude of 10 mV and a frequency of 100 kHz. The resistance values of the cells thus measured were plotted against the number of pieces of the separator, and the plots were linearly approximated to provide the gradient. The gradient was multiplied by the electrode area, i.e., 2.0 cm×1.4 cm, to provide the membrane resistance (ohm·cm²) per one piece of the separator.

[Heat Contraction Ratio]

A separator as a specimen was cut into a dimension of 18 cm (MD)×6 cm (TD). Marks were attached to the positions (point A and point B) on the line bisecting the TD at 2 cm and 17 cm from the upper edge, respectively. Furthermore, marks were attached to the positions (point C and point D) on the line bisecting the MD at 1 cm and 5 cm from the left edge, respectively. A clip was attached to the specimen (the position where the clip was attached was a position within the area of 2 cm in the MD from the upper edge), which was hanged in an oven adjusted to 175° C. for subjecting to a heat treatment for 30 minutes without tension. The distances between the points A and B and between the points C and D were measured before and after the heat treatment, and the heat contraction ratio was obtained by the expressions 4 and 5 below.

$$\text{heat contraction ratio in } MD = \{(\text{distance } AB \text{ before heat treatment} - \text{distance } AB \text{ after heat treatment})/\text{distance } AB \text{ before heat treatment}\} \times 100 \quad (4)$$

$$\text{heat contraction ratio in } TD = \{(\text{distance } CD \text{ before heat treatment} - \text{distance } CD \text{ after heat treatment})/\text{distance } CD \text{ before heat treatment}\} \times 100 \quad (5)$$

[Piercing Strength]

A separator as a specimen was subjected to a piercing test with a handy compression tester KES-G5, produced by Kato Tech Co., Ltd., under conditions of a curvature radius of the probe tip of 0.5 mm and a piercing speed of 2 mm/sec. The specimen was fixed by holding with a metallic frame having a hole with a diameter of 11.3 mm (specimen holder) along with silicone rubber packing. The maximum piercing load in the test was designated as the piercing strength.

[Oxygen Index]

The oxygen index was measured with a combustibleness tester ON-1, produced by Suga Test Instruments Co., Ltd., according to JIS K7201. A higher oxygen index means excellent combustibleness.

[Sliding Property]

The sliding property was evaluated with a card friction tester, produced by Toyo Seiki Seisaku-sho, Ltd. Specifically, a separator as a specimen was adhered to a weight of 1 kg (76 mm square), which was placed on a SUS stage with the separator directed downward. The weight was slid by 10 cm at a velocity of 90 cm/min. The surface of the specimen, which had been in contact with the SUS stage, was observed and confirmed as to whether or not it turned black. In the case where it turned black, it was determined that SUS as the stage material was abraded, and thus the specimen was evaluated as "poor". In the case where it did not turn black, it was determined that SUS as the stage material was not abraded, and thus the specimen was evaluated as "good".

[Half Period of Withstand Voltage]

The half period of withstand voltage was measured with Honestmeter (Model HO110, produced by Shishido Electrostatic, Ltd.). The measurement environment was a temperature of 20° C. and a humidity of 50%. A specimen was fixed to a specimen holder and applied with a voltage under the condition of a distance between the voltage application device and the specimen of 20 mm and an applied voltage of 5 kV. After saturating the electric charge, the voltage attenuating behavior was confirmed for 3 minutes, and the half period was calculated from the attenuation curve. A separator having a shorter half period of withstand voltage can maintain electric charge to a lower level and thus has favorable handling property.

[Coating Property]

A separator as a specimen was wound into a roll form and stored at room temperature for one month. Thereafter, the separator was wound off, and the surface state of the heat resistant porous layer was observed for evaluating the presence of missing portions of the heat resistant porous layer. The case where no missing portion was observed was evaluated as "good". The case where missing portions were observed was evaluated as "poor".

[Molecular Weight and Molecular Weight Distribution]

1% by weight of a polymer was dissolved in a solution containing DMF having 0.01 mol/L of LiCl dissolved therein, and the solution as a specimen was subjected to a GPC measurement to calculate a molecular weight distribution. The measurement was performed with Shimadzu Chromatopac C-R4A and a GPC column (GPC KD-802, produced by Showa Denko K.K.) at a detecting wavelength of 280 nm. Polystyrene molecular weight standard substances were used as the reference. As for a separator having composite of a polyethylene microporous membrane and an aramid porous layer, 1 g of the composite separator was sampled and added to 20 g of DMF having 0.01 mol/L of LiCl dissolved therein, and only aramid was dissolved at 80° C. to provide a measurement specimen. The content (% by weight) of the low molecular weight polymer in the heat resistant polymer was obtained by dividing the value S1, which was obtained by integrating the GPC curve in a zone of molecular weight of 0 to $8.0 \times 10^3$, by the value S2, which was obtained by integrating the GPC curve in a zone of molecular weight of 0 to $1.0 \times 10^6$, and multiplying the resulting value by 100, as shown in FIG. 6. The molecular weight distribution (MWD) referred herein is expressed by the ratio of the weight average molecular weight (Mw) and the number average molecular weight (Mn) obtained by GPC, and is a value obtained by the expression (6) below. The weight average molecular weight (Mw) and the number average molecular weight (Mn) were obtained by calculating in the entire zone of molecular weight of 0 to $1.0 \times 10^6$.

$$MWD = Mw/Mn \quad (6)$$

[End Group Concentration of Wholly Aromatic Polyamide]

A DMF solution containing 1% by weight of a polymer and 0.05% by weight of lithium chloride was used as a measurement specimen, which was measured with Shimadzu Chromatopac C-R4A and an ODS (octadecylsilyl) column at a detecting wavelength of 280 nm. A polymer to be evaluated was a polymer immediately after production or was collected from a heat resistant layer incorporated in a composite separator. As a method for measuring a molecular weight distribution of aramid from a heat resistant layer incorporated in a composite separator, 1 g of the composite separator was sampled and added to 20 g of DMF having 0.01 mol/L of LiCl dissolved therein, and only aramid was dissolved at 80° C. to provide a measurement specimen.

<2. Studies on Effect of Addition of Metallic Hydroxide>

A separator of the invention and a comparative separator were prepared, and the effect of addition of an inorganic filler containing a metallic hydroxide was studied.

Example 1

GUR2126 (weight average molecular weight: 4,150,000, melting point: 141° C.) and GURX143 (weight average molecular weight: 560,000, melting point: 135° C.), produced by Ticona, were used as polyethylene powder. GUR2126 and GURX143 in a ratio of 1/9 (weight ratio) were dissolved in a mixed solvent of liquid paraffin and decalin in a polyethylene concentration of 30% by weight to produce a polyethylene solution. The polyethylene solution had a composition of polyethylene/liquid paraffin/decalin=30/45/25 (weight ratio). The polyethylene solution was extruded from a die at 148° C. and cooled in a water bath, followed by drying at 60° C. for 8 minutes and 95° C. for 15 minutes, to produce a gel tape (base tape). The base tape was stretched by biaxial stretching where longitudinal stretching and transversal stretching were performed sequentially. The longitudinal stretching was 5.5 times at a stretching temperature of 90° C., and the transversal stretching was 11.0 times at a stretching temperature of 105° C. After the transversal stretching, thermal fixation was performed at 125° C. The base tape was then immersed in a methylene chloride bath to extract liquid paraffin and decalin. Thereafter, the base tape was dried at 50° C. and subjected to an annealing process at 120° C. to provide a polyethylene microporous membrane. The properties of the resulting polyethylene microporous membrane were a thickness of 11.5 μm, a porosity of 36%, an air permeability of 301 sec/100 cc, an air permeability per unit thickness of 26 sec/100 cc·μm, a membrane resistance of 2.641 ohm·cm² and a piercing strength of 380 g. The value Y/X of the polyethylene microporous membrane obtained by dividing the membrane resistance by the air permeability was $8.77 \times 10^{-3}$ ohm·cm²/(sec/100 cc).

Conex (a trade name, produced by Teijin Techno Products, Ltd.) as meta-type wholly aromatic polyamide and aluminum hydroxide (H-43M, produced by Showa Denko K.K.) having an average particle diameter of 0.8 μm were adjusted to a weight ratio of 25/75 and were mixed with a mixed solvent containing dimethylacetamide (DMAc) and tripropylene glycol (TPG) at a weight ratio of 50/50 to a concentration of the meta-type wholly aromatic polyamide of 5.5% by weight, thereby producing a coating slurry.

A pair of Meyer bars (size number #6) were disposed to face each other with a gap of 20 μm. An appropriate amount of the coating slurry was placed on the Meyer bars, and the polyethylene microporous membrane was passed through the Meyer bars, thereby coating the coating slurry on both the surfaces of the polyethylene microporous membrane. The membrane was immersed in a coagulation bath at a weight ratio of water/DMAc/TPG of 50/25/25 at 40° C., and then rinsed with water and dried to form a heat resistant porous layers on both the front and back surfaces of the polyethylene microporous membrane, thereby producing a separator for a nonaqueous secondary battery of the invention.

The properties of the separator were a weight per unit of 10.82 g/m², a coated amount of 3.83 g/m², a total thickness of 17.8 μm, a total porosity of 48%, a porosity of the heat resistant porous layer of 71%, an air permeability of 360 sec/100 cc, a membrane resistance of 3.818 ohm·cm², a heat contraction ratio in MD of 18.0%, a heat contraction ratio in TD of 22.3%, a piercing strength of 405 g, an oxygen index of 20.5%, favorable sliding property ("good"), and a half period of withstand voltage of 9.9 minutes.

Example 2

A separator for a nonaqueous secondary battery of the invention was produced in the same manner as in Example 1 except that the aluminum hydroxide was changed to magnesium hydroxide having an average particle diameter of 0.8 μm (Kisuma 5P, produced by Kyowa Chemical Industry Co., Ltd.).

The properties of the separator were a weight per unit of 13.72 g/m², a coated amount of 6.73 g/m², a total thickness of 22.4 μm, a total porosity of 52%, a porosity of the heat resistant porous layer of 69%, an air permeability of 368 sec/100 cc, a membrane resistance of 3.979 ohm·cm², a heat contraction ratio in MD of 16.3%, a heat contraction ratio in TD of 19.2%, a piercing strength of 406 g, an oxygen index of 20.0%, favorable sliding property ("good"), and a half period of withstand voltage of 19.8 minutes.

Example 3

A separator for a nonaqueous secondary battery of the invention was produced in the same manner as in Example 1 except that the coating slurry was supplied from one side of the pair of Meyer bars to form a heat resistant porous layer on one surface of the polyethylene microporous membrane.

The properties of the separator were a weight per unit of 10.62 g/m², a coated amount of 3.63 g/m², a total thickness of 20.0 μm, a total porosity of 54%, a porosity of the heat resistant porous layer of 79%, an air permeability of 355 sec/100 cc, a membrane resistance of 3.879 ohm·cm², a piercing strength of 402 g, an oxygen index of 20.0%, favorable sliding property ("good"), and a half period of withstand voltage of 10.1 minutes when a voltage was applied to the side of the heat resistant porous layer and exceeding 30 minutes when a voltage was applied to the side of the polyethylene microporous membrane. The separator exhibited curling and was not favorable in handling property. The heat contraction ratios thereof were not able to be measured due to the curling.

Comparative Example 1

The same polyethylene microporous membrane as in Example 1 was used.

Conex (a trade name, produced by Teijin Techno Products, Ltd.) as meta-type wholly aromatic polyamide and alumina (AL160SG-3, produced by Showa Denko K.K.) having an average particle diameter of 0.6 μm were adjusted to a weight ratio of 15/85 and were mixed with a mixed solvent containing dimethylacetamide (DMAc) and tripropylene glycol (TPG) at a weight ratio of 50/50 to a concentration of the meta-type wholly aromatic polyamide of 5.5% by weight, thereby producing a coating slurry.

A pair of Meyer bars (size number #6) were disposed to face each other with a gap of 20 μm. An appropriate amount of the coating slurry was placed on the Meyer bars, and the polyethylene microporous membrane was passed through the Meyer bars, thereby coating the coating slurry on both the surfaces of the polyethylene microporous membrane. The membrane was immersed in a coagulation bath at a weight ratio of water/DMAc/TPG of 50/25/25 at 40° C., and then rinsed with water and dried to form a heat resistant porous layers on both the front and back surfaces of the polyethylene microporous membrane, thereby producing a separator for a nonaqueous secondary battery of Comparative Example 1.

The properties of the separator were a weight per unit of 13.96 g/m², a coated amount of 6.97 g/m², a total thickness of 20.2 μm, a total porosity of 51%, a porosity of the heat resistant porous layer of 74%, an air permeability of 366 sec/100 cc, a membrane resistance of 3.711 ohm·cm², a heat contraction ratio in MD of 17.1%, a heat contraction ratio in TD of 19.5%, and a piercing strength of 429 g. The separator had an oxygen index of 17.5, favorable sliding property ("good"), and a half period of withstand voltage exceeding 30 minutes. It is understood from the above that Comparative Example 1 is inferior inflame retardancy and handling property as compared to Examples 1 to 3.

Comparative Example 2

The same polyethylene microporous membrane as in Example 1 was used.

Conex (a trade name, produced by Teijin Techno Products, Ltd.) as meta-type wholly aromatic polyamide was mixed with a mixed solvent containing dimethylacetamide (DMAc) and tripropylene glycol (TPG) at a weight ratio of 60/40 to a concentration of the meta-type wholly aromatic polyamide of 6.0% by weight, thereby producing a coating dope.

A pair of Meyer bars (size number #6) were disposed to face each other with a gap of 20 μm. An appropriate amount of the coating slurry was placed on the Meyer bars, and the polyethylene microporous membrane was passed through the Meyer bars, thereby coating the coating dope on both the surfaces of the polyethylene microporous membrane. The membrane was immersed in a coagulation bath at a weight ratio of water/DMAc/TPG of 50/30/20 at 40° C., and then rinsed with water and dried to form a heat resistant porous layers on both the front and back surfaces of the polyethylene microporous membrane, thereby producing a separator for a nonaqueous secondary battery of Comparative Example 2.

The properties of the separator were a weight per unit of 9.24 g/m², a coated amount of 2.25 g/m², a total thickness of 17.7 μm, a total porosity of 49%, a porosity of the heat resistant porous layer of 73%, an air permeability of 455 sec/100 cc, a membrane resistance of 3.907 ohm·cm², a heat contraction ratio in MD of 24.4%, a heat contraction ratio in TD of 56.8%, a piercing strength of 401 g, and unfavorable sliding property ("poor"). The separator had an oxygen index of 17.5% and a half period of withstand voltage exceeding 30 minutes. It is understood from the above that Comparative Example 2 is inferior in heat resistance, flame retardancy and handling property as compared to Examples 1 to 3.

Comparative Example 3

A commercially available polyethylene microporous membrane for a separator for a nonaqueous secondary battery (E20MMS, produced by Tonen Corporation) was used.

The properties of the polyethylene microporous membrane were a weight per unit of 12.9 g/m², a thickness of 20.0 μm, a porosity of 32%, an air permeability of 543 sec/100 cc, an air permeability per unit thickness of 27.2 sec/100 cc·μm, a membrane resistance of 5.828 ohm·cm², and a piercing strength of 496 g. The value Y/X of the polyethylene microporous membrane obtained by dividing the membrane resistance by the air permeability was $1.07 \times 10^{-2}$ ohm·cm²/(sec/100 cc). The separator was not able to be measured for heat contraction ratios due to significant melting, and was difficult to be measured for oxygen index due to significant contraction. The half period of withstand voltage thereof exceeded 30 minutes. It is understood from the above that Comparative Example 3 is significantly inferior in heat resistance, flame retardancy and handling property as compared to Examples 1 to 3.

[Evaluation of Properties of Separators]

The constitutions and properties of Examples 1 to 3 and Comparative Examples 1 to 3 are summarized in Table 1. In Table 1, a half period of withstand voltage exceeding 30 minutes is expressed by ">30".

TABLE 1

|  |  | Example 1 | Example 2 | Example 3 | Comparative Example 1 | Comparative Example 2 | Comparative Example 3 |
|---|---|---|---|---|---|---|---|
| Inorganic filler | Kind | Al(OH)$_3$ | Mg(OH)$_2$ | Al(OH)$_3$ | Al$_2$O$_3$ | — | — |
|  | Average particle diameter (μm) | 0.8 | 0.8 | 0.8 | 0.6 | — | — |
|  | Content (% by weight) | 75 | 75 | 75 | 85 | — | — |
| Coated surface |  | both surfaces | both surfaces | one surface | both surfaces | both surfaces | — |
| Weight per unit (g/m$^2$) |  | 10.82 | 13.72 | 10.62 | 13.96 | 9.24 | 12.9 |
| Coated amount (g/m$^2$) |  | 3.83 | 6.73 | 3.63 | 6.97 | 2.25 | — |
| Thickness (μm) | Separator | 17.8 | 22.4 | 20.0 | 20.2 | 17.7 | 20.0 |
|  | Polyethylene microporous membrane | 11.5 | 11.5 | 11.5 | 11.5 | 11.5 | 20.0 |
|  | Heat resistant porous layer | 6.3 | 10.9 | 8.5 | 8.7 | 6.2 | — |
| Porosity (%) | Separator | 48 | 52 | 54 | 51 | 49 | 32 |
|  | Polyethylene microporous membrane | 36 | 36 | 36 | 36 | 36 | 32 |
|  | Heat resistant porous layer | 71 | 69 | 79 | 74 | 73 | — |
| Air permeability (sec/100 cc) |  | 360 | 368 | 355 | 366 | 455 | 543 |
| Membrane resistance (ohm · cm$^2$) |  | 3.818 | 3.979 | 3.879 | 3.711 | 3.907 | 5.828 |
| Heat contraction ratio (%) | MD | 18.0 | 16.3 | —[1] | 17.1 | 24.4 | —[2] |
|  | TD | 22.3 | 19.2 | —[1] | 19.5 | 56.8 | —[2] |
| Piercing strength (g) |  | 405 | 406 | 402 | 429 | 401 | 496 |
| Oxygen index (%) |  | 20.5 | 20.0 | 20.0 | 17.5 | 17.5 | —[3] |
| Sliding property |  | good | good | good | good | poor | good |
| Half period of withstand voltage (min) |  | 9.9 | 19.8 | 10.1[4] > 30[4] | >30 | >30 | >30 |

[1] Unable to measure due to curling
[2] Unable to measure due to melting
[3] Unable to measure due to significant contraction
[4] Upper line: value on applying voltage to coated surface
Lower line: value on applying voltage to surface of polyethylene microporous membrane

[Evaluation of Shutdown (SD) Characteristics]

The separators of Examples 1 and 2 and Comparative Examples 1 and 3 as specimens were each punched to a circle with a diameter of 19 mm, and immersed in a methanol solution having 3% by weight of a nonionic surfactant (Emulgen 210P, produced by Kao Corporation) dissolved therein, followed by air drying. The separator was impregnated with an electrolytic solution and held by SUS plates (diameter: 15.5 mm). The electrolytic solution was obtained by dissolving LiBF$_4$ in a concentration of 1 M in a solvent containing propylene carbonate and ethylene carbonate mixed at a weight ratio of 1/1. The assembly was encapsulated in a 2032 type coin cell. Lead wires were connected to the coin cell, which was attached with a thermocouple and placed in an oven. The temperature was increased at a temperature increasing rate of 1.6° C./min, and the cell was applied with an alternating electric current having an amplitude of 10 mV and a frequency of 1 kHz, thereby measuring the resistance of the cell. The results of the measurement are shown in FIG. 1.

It is understood from FIG. 1 that Examples 1 and 2 show favorable shutdown characteristics as similar to the polyethylene microporous membrane of Comparative Example 3, and shutdown starts to occur at a lower temperature than Comparative Example 1. In particular, Example 1 increases in resistance by approximately 10 times around 100° C., and thus is preferred from the standpoint that shutdown occurs at a lower temperature.

In a temperature range of approximately 150° C. or more after shutdown, Examples 1 and 2 continuously maintain a high resistance while varying slightly. On the other hand, the resistance of Comparative Example 1 is gradually decreased, and that of Comparative Example 3 is quickly decreased. It is understood from the above that Examples 1 and 2 are excellent in anti-meltdown characteristics as compared to Comparative Examples 1 and 3. In particular, it is confirmed that Example 1 has considerably excellent anti-meltdown characteristics.

[Test Production of Nonaqueous Secondary Battery]

89.5 parts by weight of powder of lithium cobaltate (LiCoO$_2$, produced by Nippon Chemical Industrial Co., Ltd.), 4.5 parts by weight of acetylene black (Denka Black, a trade name, produced by Denki Kagaku Kogyo Co., Ltd.) and 6 parts by weight of polyvinylidene fluoride (produced by Kureha Corporation) were kneaded with N-methyl-2-pyrrolidone as a solvent to produce a slurry. The resulting slurry was coated on an aluminum foil having a thickness of 20 μm, and dried, followed by pressing, to provide a positive electrode of 100 μm.

87 parts by weight of powder of mesophase carbon microbeads (MCMB, produced by Osaka Gas Chemicals Co., Ltd.), 3 parts by weight of acetylene black (Denka Black, a trade name, produced by Denki Kagaku Kogyo Co., Ltd.) and 10 parts by weight of polyvinylidene fluoride (produced by Kureha Corporation) were kneaded with N-methyl-2-pyrrolidone as a solvent to produce a slurry. The resulting slurry was coated on a copper foil having a thickness of 18 μm, and dried, followed by pressing, to provide a negative electrode of 90 μm.

The positive electrode and the negative electrode were disposed to face to each other with a separator intervening therebetween. The assembly was impregnated with an electrolytic solution and encapsulated in an outer package formed of an aluminum laminated film to produce a nonaqueous secondary battery. The electrolytic solution (produced by Kishida Chemical Co., Ltd.) in which LiPF$_6$ was dissolved at a concentration of 1 M in a solvent containing ethylene carbonate and ethylmethyl carbonate mixed at a weight ratio of 3/7 was used.

The test-produced battery had a positive electrode area of 2×1.4 cm$^2$, a negative electrode area of 2.2×1.6 cm$^2$, and a capacity of 8 mAh (in a range of 4.2 V to 2.75 V).

[Evaluation of Durability 1]

Nonaqueous secondary batteries were produced according to the aforementioned manner by using the separator of Example 1 and the polyethylene microporous membrane of Comparative Example 3. The batteries were each charged for 100 hours at 60° C., a constant current of 8 mA and a constant voltage of 4.3 V. The time-lapse change of the charging current is shown in FIG. 2.

After completing the test, the cell was disassembled, and the separator was observed. The polyethylene microporous membrane of Comparative Example 3 was discolored to black, and the discoloration was conspicuous on the surface that was in contact with the positive electrode. On the other hand, no discoloration was found in the separator of Example 1.

Figure 2:
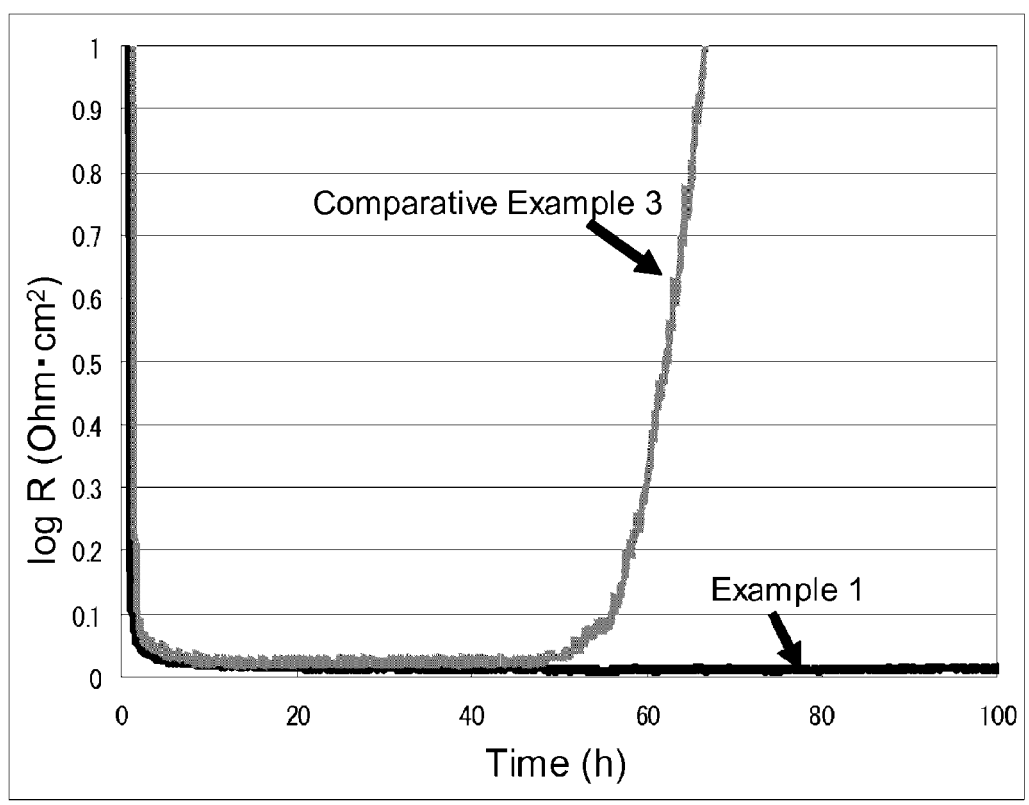
[FIG. 2] The figure is a graph showing results of durability evaluation 1 of separators of the invention and other separators.

It is understood from FIG. 2 and the observation results that Example 1 is excellent in anti-redox property and has high durability as compared to Comparative Example 3.

[Evaluation of Durability 2]

Nonaqueous secondary batteries were produced according to the aforementioned manner by using the separator of Example 1 and the polyethylene microporous membrane of Comparative Example 3. The batteries were each charged at 60° C., a constant current of 8 mA and a constant voltage of 4.3 V. The charging was terminated at an arbitrary time, and at a battery voltage of 4.3 V and 25° C., the battery was applied with an alternating current of a frequency of 100 kHz and an amplitude of 10 mV to measure the alternating current resistance of the cell. The results are shown in FIG. 3.

The cell after completing the measurement was observed, and as a result, it was confirmed that the cell using the polyethylene microporous membrane of Comparative Example 3 suffered significant bulge, but the cell using Example 1 suffered no bulge.

Figure 3:
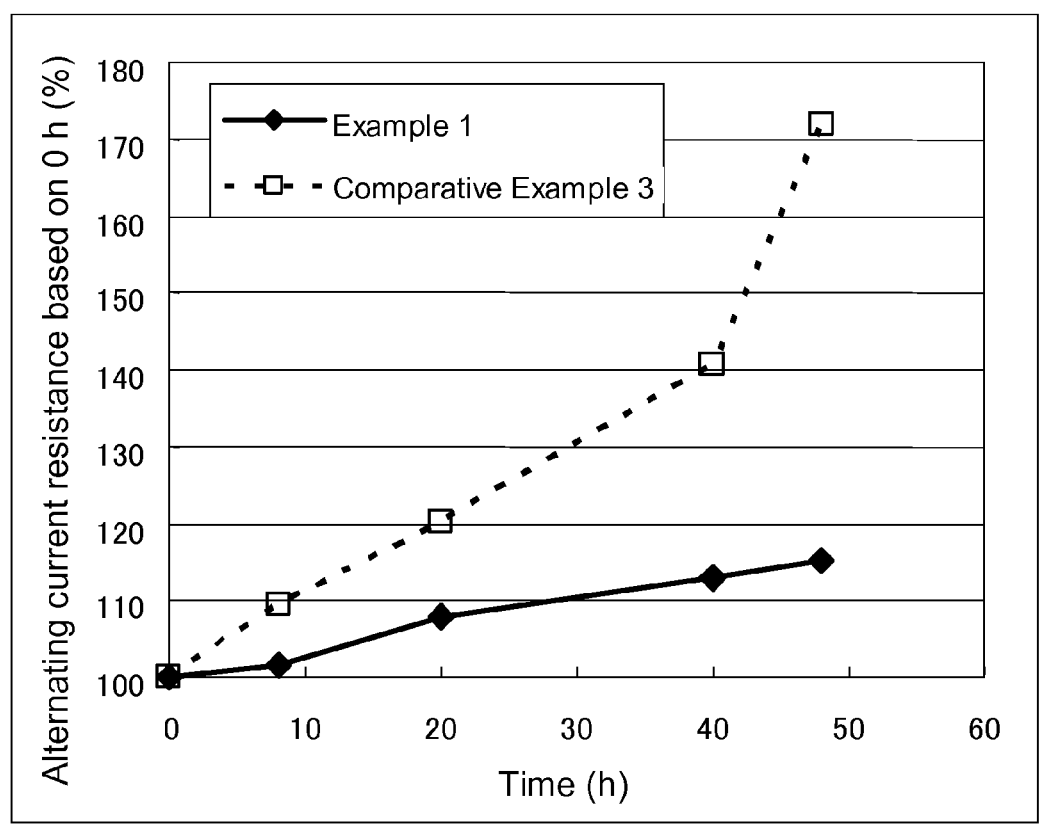
[FIG. 3] The figure is a graph showing results of durability evaluation 2 of separators of the invention and other separators.

It is understood from FIG. 3 and the observation results that the use of Example 1 suppresses the electrolytic solution from being decomposed to show excellent durability as compared to the use of Comparative Example 3.

[Oven Test]

Nonaqueous secondary batteries were produced according to the aforementioned manner by using the separator of Example 1 and the polyethylene microporous membrane of Comparative Example 3. The batteries were each charged to 4.2 V. The battery was placed in an oven, and a weight of 5 kg was placed thereon. In this state, the oven was set in such a manner that the temperature of the battery was increased by 2° C. per minute to heat the battery to 200° C. The changes in battery voltage are shown in FIG. 4.

Figure 4:
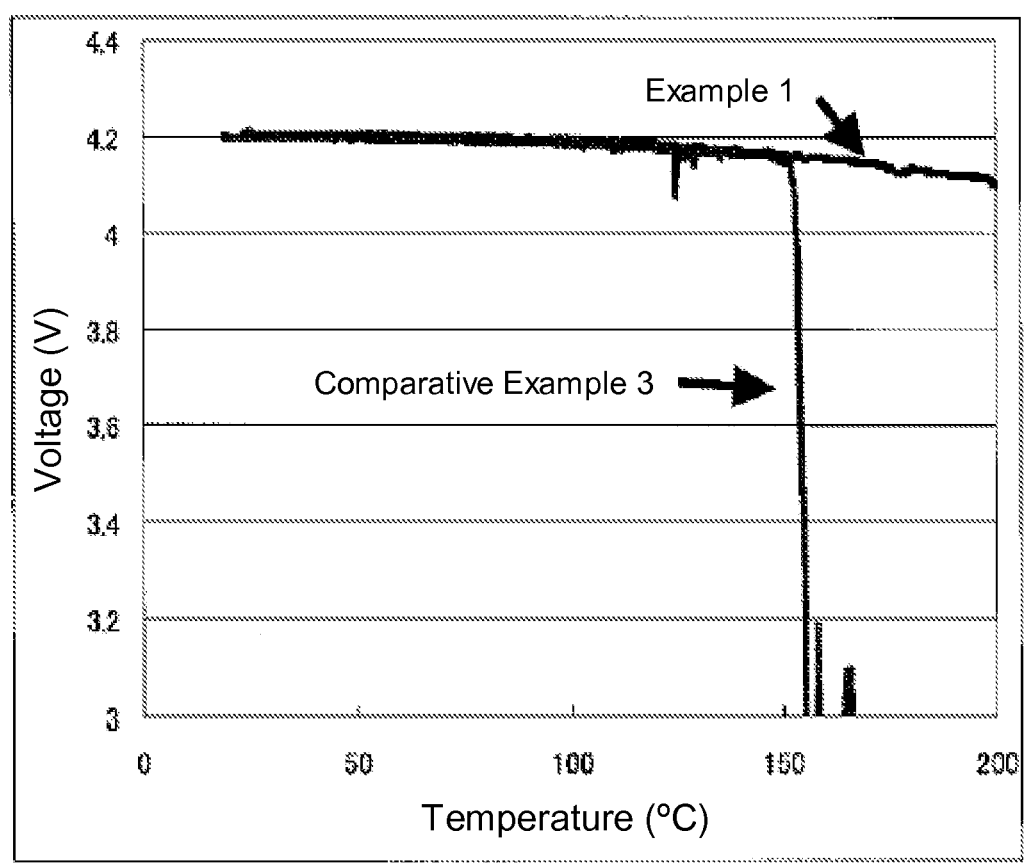
[FIG. 4] The figure is a graph showing results of an oven test of separators of the invention and other separators.

It is confirmed from FIG. 4 that Example 1 suffers substantially no change in battery voltage even on exposing to a high temperature, but Comparative Example 3 suffers quick decrease in battery voltage around 150° C. It is understood from the above that Example 1 is difficult to cause short circuit even on exposing to a high temperature and is excellent in mechanical strength at a high temperature as compared to Comparative Example 3.

[DSC Analysis]

The separator of Example 1 was analyzed with DSC (differential scanning calorimetry). DSC2920, produced by TA Instruments Japan Co., Ltd., was used as a measuring apparatus. A measurement specimen was produced by weighing 5.5 mg of the separator of Example 1 and crimped in an aluminum pan. The measurement was performed in a nitrogen gas atmosphere at a temperature increasing rate of 5° C. per minute and a temperature range of 30 to 350° C. The measurement results are shown in FIG. 5.

Figure 5:
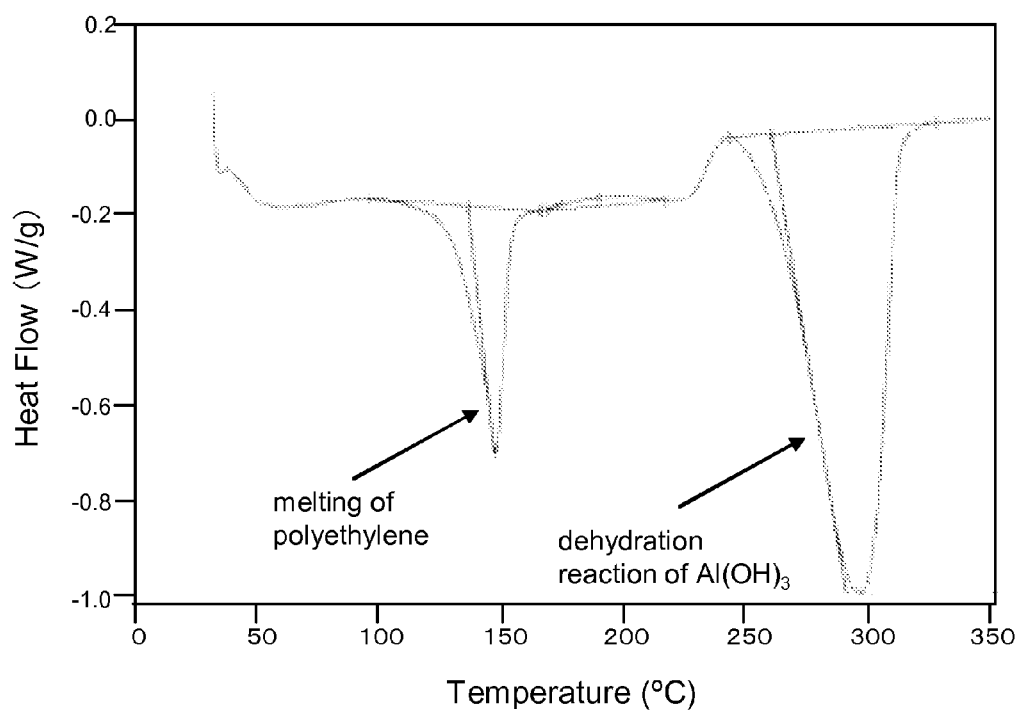
[FIG. 5] The figure is a graph showing results of DSC analysis of separators of the invention.

In FIG. 5, an endothermic peak corresponding to melting of polyethylene was observed at 110 to 160° C., and a large endothermic peak corresponding to dehydration reaction of aluminum hydroxide was observed at 250 to 320° C. It is understood from the above that in Example 1, the polyethylene microporous membrane is melted to cause shutdown, and then upon exposing to a high temperature, aluminum hydroxide undergoes dehydration reaction associated with large endothermic reaction. It is also understood from the phenomenon that the separator of the invention is excellent in flame retardancy.

<3. Studies on Particle Size Distribution of Inorganic Filler>

The influence of the particle size distribution of the inorganic filler was studied by changing the particle size distribution of the inorganic filler.

Example 4

160.5 g of isophthalic acid chloride was dissolved in 1,120 mL of tetrahydrofuran, to which a solution obtained by dissolving 85.2 g of m-phenylenediamine in 1,120 mL of tetrahydrofuran was gradually added in the form of thin flow under stirring, thereby providing a white turbid milky white solution. After continuing the stirring for approximately 5 minutes, an aqueous solution obtained by dissolving 167.6 g of sodium carbonate and 317 g of sodium chloride in 3,400 mL of water was quickly added thereto under stirring, followed by further stirring for 5 minutes. The reaction system was increased in viscosity after several seconds and then decreased in viscosity, thereby providing a white suspension liquid. After allowing to stand the suspension liquid, a transparent aqueous solution layer thus separated was removed, and 185.3 g of white polymer of poly-m-phenylene isophthalamide was obtained by filtration.

The poly-m-phenylene isophthalamide thus obtained in the aforementioned manner and an inorganic filler containing aluminum hydroxide (H-43M, produced by Showa Denko K.K.) were mixed at a weight ratio of 25/75, and mixed in a concentration of poly-m-phenylene isophthalamide of 5.5% by weight with a mixed solvent containing dimethylacetamide (DMAc) and tripropylene glycol (TPG) at a weight ratio of 50/50, thereby providing a coating slurry. The particle size distribution of the inorganic filler was d90 of 1.05, d50 of 0.75 and d10 of 0.38.

A polyethylene microporous membrane used was one produced in the same manner as in Example 1. A separator for a nonaqueous secondary battery of the invention was produced in the same manner as in Example 1 except that the aforementioned coating slurry was used. The resulting separator was analyzed, and the evaluation results for sliding property and coating property are shown in Table 2.

Example 5

A separator for a nonaqueous secondary battery of the invention was produced in the same manner as in Example 4 except that the inorganic filler was changed to aluminum hydroxide (H-42M, produced by Showa Denko K.K.) having a particle size distribution of d90 of 1.07, d50 of 1.02 and d10 of 0.50 by laser diffraction. The resulting separator was analyzed, and the results are shown in Table 2.

Example 6

A separator for a nonaqueous secondary battery of the invention was produced in the same manner as in Example 4 except that the inorganic filler was changed to aluminum hydroxide (H-32, produced by Showa Denko K.K.) having a particle size distribution of d90 of 22.0, d50 of 8.0 and d10 of 1.50 by laser diffraction. The resulting separator was analyzed, and the results are shown in Table 2.

Example 7

A separator for a nonaqueous secondary battery of the invention was produced in the same manner as in Example 4 except that the inorganic filler was changed to aluminum hydroxide (H-21, produced by Showa Denko K.K.) having a particle size distribution of d90 of 58.0, d50 of 23.0 and d10 of 5.10 by laser diffraction. The resulting separator was analyzed, and the results are shown in Table 2.

TABLE 2

|  | d10 | d50 | d90 | α | Sliding property | Coating property |
|---|---|---|---|---|---|---|
| Example 4 | 0.38 | 0.75 | 1.05 | 0.89 | good | good |
| Example 5 | 0.50 | 1.02 | 1.07 | 0.56 | good | good |
| Example 6 | 1.50 | 8.0 | 22.0 | 2.56 | good | poor |
| Example 7 | 5.10 | 23.0 | 58.0 | 2.30 | good | poor |

It is understood from the results in Table 2 that Examples 4 and 5 are excellent in both sliding property and coating property, but Examples 6 and 7 are inferior in coating property. It is understood from the above that the inorganic filler preferably has $0.1 \leq d50 \leq 1$ (μm) and $0 < \alpha \leq 2$. While Examples 6 and 7 are inferior in coating property, they suffer no adverse influence upon applying practically to a battery, but have heat resistance, shutdown characteristics, flame retardancy and handling property that are equivalent to Example 1, thereby attaining sufficiently the objects of the invention.

<4. Studies on Molecular Weight and the Like of Heat Resistant Resin>

The effect of the molecular weight and the like of the heat resistant resin was studied.

Example 8

160.5 g of isophthalic acid chloride was dissolved in 1,120 mL of tetrahydrofuran, to which a solution obtained by dissolving 85.2 g of m-phenylenediamine in 1,120 mL of tetrahydrofuran was gradually added in the form of thin flow under stirring, thereby providing a white turbid milky white solution. After continuing the stirring for approximately 5 minutes, an aqueous solution obtained by dissolving 167.6 g of sodium carbonate and 317 g of sodium chloride in 3,400 mL of water was quickly added thereto under stirring, followed by further stirring for 5 minutes. The reaction system was increased in viscosity after several seconds and then decreased in viscosity, thereby providing a white suspension liquid. After allowing to stand the suspension liquid, a transparent aqueous solution layer thus separated was removed, and 185.3 g of white polymer of poly-m-phenylene isophthalamide was obtained by filtration. The polymer had a molecular weight distribution Mw/Mn of 6, a weight average molecular weight Mw of $1.5 \times 10^5$ and a content of a low molecular weight matter having a molecular weight of 8,000 or less of 3.4% by weight.

A separator for a nonaqueous secondary battery of the invention was produced in the same manner as in Example 1 except that the poly-m-phenylene isophthalamide obtained above was used. The properties of the separator were a porosity of the heat resistant porous layer of 70%, an air permeability of 310 sec/100 cc, a membrane resistance of 2.8 ohm·cm² and a total thickness of 20 μm.

Example 9

185.0 g of white polymer of poly-m-phenylene isophthalamide was obtained in the same manner as in Example 8 except that a solution obtained by dissolving 160.5 g of isophthalic acid chloride in 1,120 mL of tetrahydrofuran and a solution obtained by dissolving 83.9 g of m-phenylenediamine in 1,120 mL of tetrahydrofuran were used. The poly-m-phenylene isophthalamide had a molecular weight distribution Mw/Mn of 10, a weight average molecular weight Mw of $2.0 \times 10^5$ and a content of a low molecular weight matter having a molecular weight of 8,000 or less of 3.0% by weight.

A separator for a nonaqueous secondary battery of the invention was produced in the same manner as in Example 1 except that the poly-m-phenylene isophthalamide obtained above was used. The properties of the separator were a porosity of the heat resistant porous layer of 65%, an air permeability of 320 sec/100 cc, a membrane resistance of 3.0 ohm·cm² and a total thickness of 20 μm.

Example 10

753 g of NMP having a water fraction of 100 ppm or less was placed in a reactor equipped with a thermometer, a stirring device and a raw material charging port, and 85.5 g of m-phenylenediamine was dissolved in NMP, followed by cooling to 0° C. 160.5 g of isophthalic acid chloride was gradually added to the cooled diamine solution under stirring to perform reaction. The temperature of the solution was increased to 70° C. through the reaction. After terminating the viscosity change, 58.4 g of calcium hydroxide in a powder form was added thereto, and the reaction was completed by stirring for further 40 minutes. The polymerization solution was taken out and reprecipitated in water to provide 184.0 g of poly-m-phenylene isophthalamide. The polymer had a molecular weight distribution Mw/Mn of 4, a weight average molecular weight Mw of $1.0 \times 10^5$ and a content of a low molecular weight matter having a molecular weight of 8,000 or less of 0.8% by weight.

A separator for a nonaqueous secondary battery of the invention was produced in the same manner as in Example 1 except that the poly-m-phenylene isophthalamide obtained above was used. The properties of the separator were a porosity of the heat resistant porous layer of 70%, an air permeability of 400 sec/100 cc, a membrane resistance of 4.9 ohm·cm² and an average thickness of 20 μm.

The aforementioned results are summarized in Table 3. The composite separators of Examples 8 to 10 were subjected to GPC measurement of poly-m-phenylene isophthalamide, and as a result, the molecular weight distribution Mw/Mn and the weight average molecular weight Mw were equivalent to the polymers before coating.

TABLE 3

|  | Mw/Mn | Mw ($\times 10^5$) | Content of low molecular weight matter (% by weight) | Porosity of heat resistant layer (%) | Air permeability (sec/100 cc) | Membrane resistance (ohm·cm²) |
|---|---|---|---|---|---|---|
| Example 8 | 6 | 1.5 | 3.4 | 70 | 310 | 2.8 |
| Example 9 | 10 | 2.0 | 3 | 65 | 320 | 3.0 |
| Example 10 | 4 | 1.0 | 0.8 | 70 | 400 | 4.9 |

It is understood from the results in Table 3 that the separators of Examples 8 and 9 are excellent in air permeability and membrane resistance as compared to the separator of Example 10. It is understood from the above that it is preferred to use a polymer having a molecular weight distribution Mw/Mn satisfying 5≤Mw/Mn≤100 and a weight average molecular weight Mw of $8.0 \times 10^3$ to $1.0 \times 10^6$, or to use a polymer containing a low molecular weight polymer having a molecular weight of 8,000 or less in an amount of 1 to 15% by weight. While Example 10 is inferior in air permeability and membrane resistance, it suffers no problem in practical use, but has heat resistance, shutdown characteristics, flame retardancy and handling property that are equivalent to Example 1, thereby attaining sufficiently the objects of the invention.

<5. Studies on End Group Concentration Ratio of Polyamide>

The effect of the end group concentration ratio of the wholly aromatic polyamide was studied.

Example 11

160.5 g of isophthalic acid chloride was dissolved in 1,120 mL of tetrahydrofuran, to which a solution obtained by dissolving 84.9 g of m-phenylenediamine in 1,120 mL of tetrahydrofuran was gradually added in the form of thin flow under stirring, thereby providing a white turbid milky white solution. After continuing the stirring for approximately 5 minutes, an aqueous solution obtained by dissolving 167.6 g of sodium carbonate and 317 g of sodium chloride in 3,400 mL of water was quickly added thereto under stirring, followed by further stirring for 5 minutes. The reaction system was increased in viscosity after several seconds and then decreased in viscosity, thereby providing a white suspension liquid. After allowing to stand the suspension liquid, a transparent aqueous solution layer thus separated was removed, and 185.3 g of white polymer of poly-m-phenylene isophthalamide was obtained by filtration. The polyamide had an end group concentration ratio [COOX]/[NH$_2$] of 2.2. A separator for a nonaqueous secondary battery of the invention was produced in the same manner as in Example 1 except that the poly-m-phenylene isophthalamide obtained above was used.

A button battery was produced by using the aforementioned separator in the following manner.

89.5 parts by weight of powder of lithium cobaltate (LiCoO$_2$, produced by Nippon Chemical Industrial Co., Ltd.), 4.5 parts by weight of acetylene black and a 6% by weight NMP solution of PVdF providing 6 parts by weight of PVdF in terms of dry weights were used to prepare a positive electrode paste. The resulting paste was coated on an aluminum foil having a thickness of 20 μm, and dried, followed by pressing, to provide a positive electrode having a thickness of 97 μm.

87 parts by weight of powder of mesophase carbon microbeads (MCMB, produced by Osaka Gas Chemicals Co., Ltd.), 3 parts by weight of acetylene black and a 6% by weight NMP solution of PVdF providing 10 parts by weight of PVdF in terms of dry weights were used to prepare a negative electrode paste. The resulting paste was coated on a copper foil having a thickness of 18 μm, and dried, followed by pressing, to provide a negative electrode of 90 μm.

A button battery (CR2032) having a capacity of approximately 4.5 mAh was produced by using the separator for a nonaqueous secondary battery, the positive electrode and the negative electrode mentioned above. The electrolytic solution was obtained by dissolving LiPF$_6$ in a concentration of 1 M in a solvent containing ethylene carbonate, diethyl carbonate and ethylmethyl carbonate mixed at a weight ratio of 11/2/1.

The button battery thus produced was able to perform charging and discharging without any problem. After the button battery was subjected to 100 cycles of constant current and constant voltage charging at 4.2 V and constant current discharging at 2.75 V, the battery was measured for discharge capacity, and thus it was found that the battery had favorable cycle characteristics of 4.1 mAh.

Example 12

753 g of NMP having a water fraction of 100 ppm or less was placed in a reactor equipped with a thermometer, a stirring device and a raw material charging port, and 84.9 g of m-phenylenediamine was dissolved in NMP, followed by cooling to 0° C. 160.5 g of isophthalic acid chloride was gradually added to the cooled diamine solution under stirring to perform reaction. The temperature of the solution was increased to 70° C. through the reaction. After terminating the viscosity change, 58.4 g of calcium hydroxide in a powder form was added thereto, and the reaction was completed by stirring for further 40 minutes. The polymerization solution was taken out and reprecipitated in water to provide 184.0 g of poly-m-phenylene isophthalamide. The polyamide had an end group concentration ratio [COOX]/[NH$_2$] of 2.1. A separator for a nonaqueous secondary battery of the invention was produced in the same manner as in Example 1 except that the poly-m-phenylene isophthalamide obtained above was used.

A button battery was produced in the same manner as in Example 11 except that the resulting separator was used. The button battery thus produced was able to perform charging and discharging without any problem. After the button battery was subjected to 100 cycles of constant current and constant voltage charging at 4.2 V and constant current discharging at 2.75 V, the battery was measured for discharge capacity, and thus it was found that the battery had favorable cycle characteristics of 4.1 mAh.

Example 13

16.4 g of poly-m-phenylene isophthalamide in the form of a white polymer was obtained in the same manner as in Example 11 except that 86.4 g of m-phenylenediamine was used. The polyamide had an end group concentration ratio [COOX]/[NH$_2$] of 0.8. A separator for a nonaqueous secondary battery of the invention was produced in the same manner as in Example 1 except that the poly-m-phenylene isophthalamide obtained above was used.

A button battery was produced in the same manner as in Example 11 except that the resulting separator was used. The button battery thus produced was able to perform charging and discharging without any problem. After the button battery was subjected to 100 cycles of constant current and constant voltage charging at 4.2 V and constant current discharging at 2.75 V, the battery was measured for discharge capacity, and it was 2.2 mAh.

The results are summarized in Table 4.

TABLE 4

| | [COOX]/[NH$_2$] | Discharge capacity after 100 cycles (mAh) |
|---|---|---|
| Example 11 | 2.2 | 4.1 |
| Example 12 | 2.1 | 4.1 |
| Example 13 | 0.8 | 2.2 |

It is understood from Table 4 that Examples 11 and 12 are excellent in charging and discharging characteristics as compared to Example 13. It is understood from the above that, when aromatic polyamide is used as the heat resistant resin, the end group concentration ratio of the aromatic polyamide is preferably [COOX]/[NH$_2$]≥1. While Example 13 is slightly inferior in cycle characteristics, it suffers no problem in practical use, but has heat resistance, shutdown characteristics, flame retardancy and handling property that are equivalent to Example 1, thereby attaining sufficiently the objects of the invention.

Industrial Applicability

The invention is effectively utilized as techniques for enhancing characteristics of a nonaqueous secondary battery.

What is claimed is:

1. A separator for a nonaqueous secondary battery comprising a polyolefin microporous membrane at least one surface of which is laminated with a heat resistant porous layer consisting of a heat resistant resin and an inorganic filler,
    the heat resistant resin having a melting point of 250° C. or more or a thermal decomposition temperature of 250° C. or more,
    the inorganic filler containing a metallic hydroxide that undergoes dehydration reaction at a temperature of 200 to 400° C.,
    wherein the heat resistant resin contains a low molecular weight polymer having a molecular weight of 8,000 or less in an amount of 1 to 15% by weight.

2. The separator for a nonaqueous secondary battery according to claim 1, wherein the heat resistant resin is wholly aromatic polyamide, and the wholly aromatic polyamide has an end group concentration ratio of [COOX]/[NH$_2$] ≥1, wherein X represents an alkali metal or an alkaline earth metal.

3. The separator for a nonaqueous secondary battery according to claim 1, wherein the metallic hydroxide is at least one of aluminum hydroxide and magnesium hydroxide.

4. The separator for a nonaqueous secondary battery according to claim 1, wherein the inorganic filler is surface-treated with a silane coupling agent.

5. A nonaqueous secondary battery comprising a positive electrode, a negative electrode, a separator provided between the electrodes, and a nonaqueous electrolytic solution,
    wherein the separator is the separator for a nonaqueous secondary battery according to claim 1.

6. A nonaqueous secondary battery comprising a positive electrode, a negative electrode, a separator provided between the electrodes, and a nonaqueous electrolytic solution,
    wherein the separator is the separator for a nonaqueous secondary battery according to claim 2.

7. A nonaqueous secondary battery comprising a positive electrode, a negative electrode, a separator provided between the electrodes, and a nonaqueous electrolytic solution,
    wherein the separator is the separator for a nonaqueous secondary battery according to claim 3.

8. A nonaqueous secondary battery comprising a positive electrode, a negative electrode, a separator provided between the electrodes, and a nonaqueous electrolytic solution,
    wherein the separator is the separator for a nonaqueous secondary battery according to claim 4.

* * * * *